United States Patent
Toyoda

(10) Patent No.: US 10,701,231 B2
(45) Date of Patent: Jun. 30, 2020

(54) INFORMATION PROCESSING APPARATUS CAPABLE OF STOPPING POWER FEED TO NONVOLATILE STORAGE PORTION, POWER FEED CONTROL METHOD

(71) Applicant: KYOCERA Document Solutions Inc., Osaka-shi, Osaka (JP)

(72) Inventor: Takashi Toyoda, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/418,341

(22) Filed: May 21, 2019

(65) Prior Publication Data

US 2019/0364167 A1 Nov. 28, 2019

(30) Foreign Application Priority Data

May 22, 2018 (JP) .................................. 2018-097892

(51) Int. Cl.
| | | |
|---|---|---|
| *H04N 1/00* | (2006.01) | |
| *G06F 3/06* | (2006.01) | |
| *G06F 1/3296* | (2019.01) | |
| *G06F 1/28* | (2006.01) | |

(52) U.S. Cl.
CPC ........... *H04N 1/00896* (2013.01); *G06F 1/28* (2013.01); *G06F 1/3296* (2013.01); *G06F 3/0625* (2013.01); *G06F 3/0659* (2013.01); *G06F 3/0679* (2013.01); *H04N 1/00891* (2013.01); *H04N 1/00904* (2013.01); *H04N 2201/0094* (2013.01)

(58) Field of Classification Search
CPC ........... H04N 1/00896; H04N 1/00891; H04N 1/00901; H04N 1/00904; H04N 2201/0094; G06F 3/0625; G06F 3/1221; G06F 3/1229; G06F 1/3296
See application file for complete search history.

(56) References Cited

U.S. PATENT DOCUMENTS

| | | | |
|---|---|---|---|
| 2009/0235102 A1* | 9/2009 | Koshika ............. | G03G 15/5004 713/324 |
| 2013/0166932 A1* | 6/2013 | Iarovici ................ | G06F 1/3206 713/323 |
| 2019/0052764 A1* | 2/2019 | Hara ...................... | G11B 19/02 |

FOREIGN PATENT DOCUMENTS

JP 2003198769 A 7/2003

* cited by examiner

*Primary Examiner* — Kent Yip
(74) *Attorney, Agent, or Firm* — Alleman Hall Creasman & Tuttle LLP

(57) ABSTRACT

An information processing apparatus includes first and second power feed control portions and a storage processing portion. The first power feed control portion stops power feed to a nonvolatile first storage portion when reading or writing data from/to the first storage portion is completed. In a case where power feed to the first storage portion is stopped, the storage processing portion stores specific data among data stored in the first storage portion into a second storage portion. When an access request for accessing data in the first storage portion has been received: when access-target data specified in the access request is not stored in the second storage portion, the second power feed control portion resumes power feed to the first storage portion; and when the access-target data is stored in the second storage portion, does not resume the power feed to the first storage portion.

5 Claims, 5 Drawing Sheets

INFORMATION PROCESSING APPARATUS CAPABLE OF STOPPING POWER FEED TO NONVOLATILE STORAGE PORTION, POWER FEED CONTROL METHOD

INCORPORATION BY REFERENCE

This application is based upon and claims the benefit of priority from the corresponding Japanese Patent Application No. 2018-097892 filed on May 22, 2018, the entire contents of which are incorporated herein by reference.

BACKGROUND

The present disclosure relates to an information processing apparatus and a power feed control method.

In an information processing apparatus such as a multifunction peripheral, after reading data from or writing data to a nonvolatile storage portion, such as a HDD (hard disk drive), is completed, power feed to the storage portion may be stopped for the purpose of suppressing power consumption. In addition, there is known an information processing apparatus that controls the activation timing of a storage portion after stopping the power feed to the storage portion, for the purpose of suppressing unnecessary activations of the storage portion.

SUMMARY

An information processing apparatus according to an aspect of the present disclosure includes a first power feed control portion, a storage processing portion, and a second power feed control portion. The first power feed control portion stops power feed to a nonvolatile first storage portion when reading data from or writing data to the first storage portion is completed. In a case where the power feed to the first storage portion is stopped, the storage processing portion stores predetermined specific data among data stored in the first storage portion into a second storage portion. When an access request for accessing data stored in the first storage portion has been received: when access-target data specified in the access request is not stored in the second storage portion, the second power feed control portion resumes power feed to the first storage portion; and when the access-target data is stored in the second storage portion, the second power feed control portion does not resume the power feed to the first storage portion.

A power feed control method according to an aspect of the present disclosure executes: stopping power feed to a nonvolatile first storage portion when reading data from or writing data to the first storage portion is completed; in a case where the power feed to the first storage portion is stopped, storing predetermined specific data among data stored in the first storage portion into a second storage portion; and when an access request for accessing data stored in the first storage portion is received, and access-target data specified in the access request is not stored in the second storage portion, resuming power feed to the first storage portion, and when the access request for accessing the data stored in the first storage portion is received, and the access-target data is stored in the second storage portion, not resuming the power feed to the first storage portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

Outline Configuration of Image Forming Apparatus 10

First, an outline configuration of an image forming apparatus 10 according to an embodiment of the present disclosure is described with reference to FIG. 1 and FIG. 2. Here, FIG. 1 is a schematic cross-sectional diagram showing a configuration of the image forming apparatus 10.

The image forming apparatus 10 is a multifunction peripheral having a plurality of functions such as a scan function for reading image data from a document sheet, a print function for forming an image based on image data, a facsimile function, and a copy function.

Figure 1:
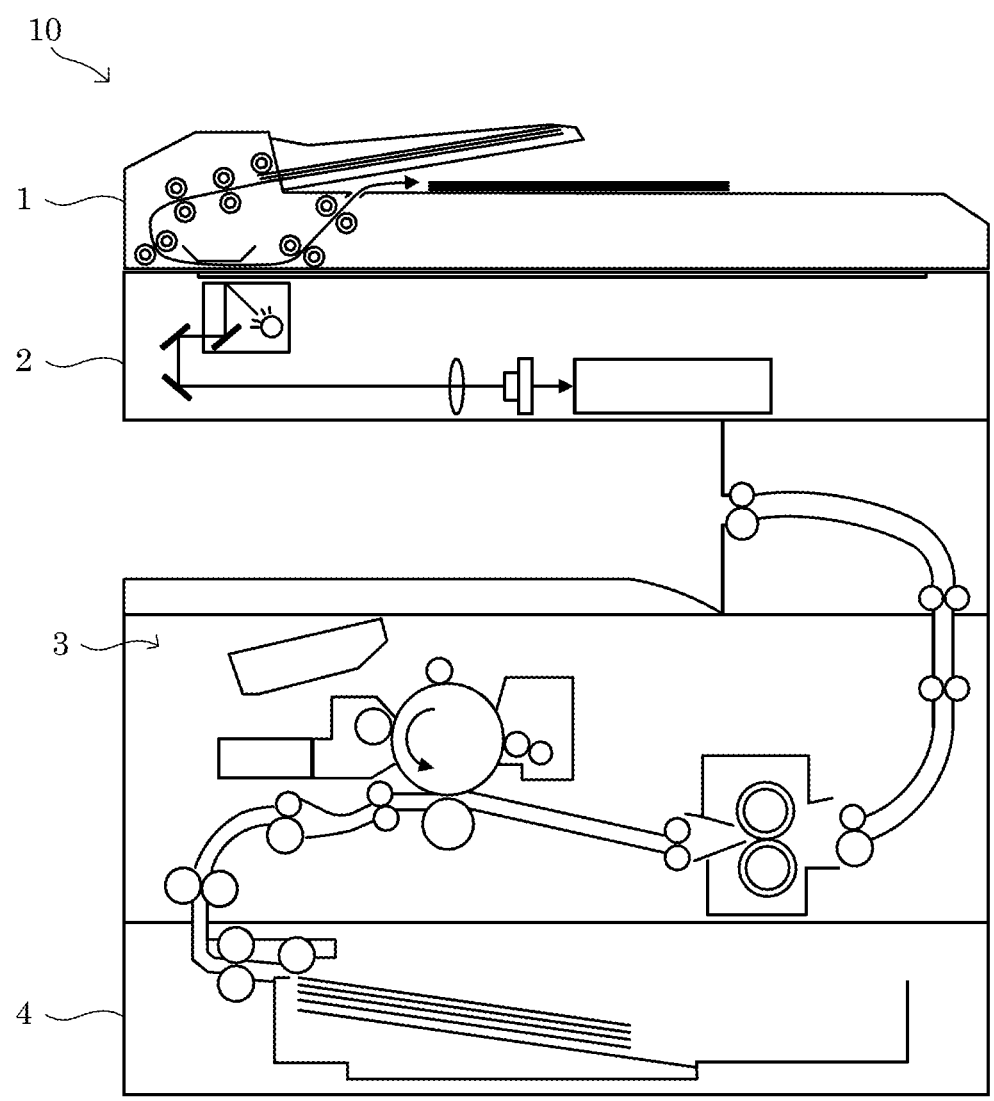
FIG. 1 is a diagram showing a configuration of an image forming apparatus according to an embodiment of the present disclosure.
Figure 2:
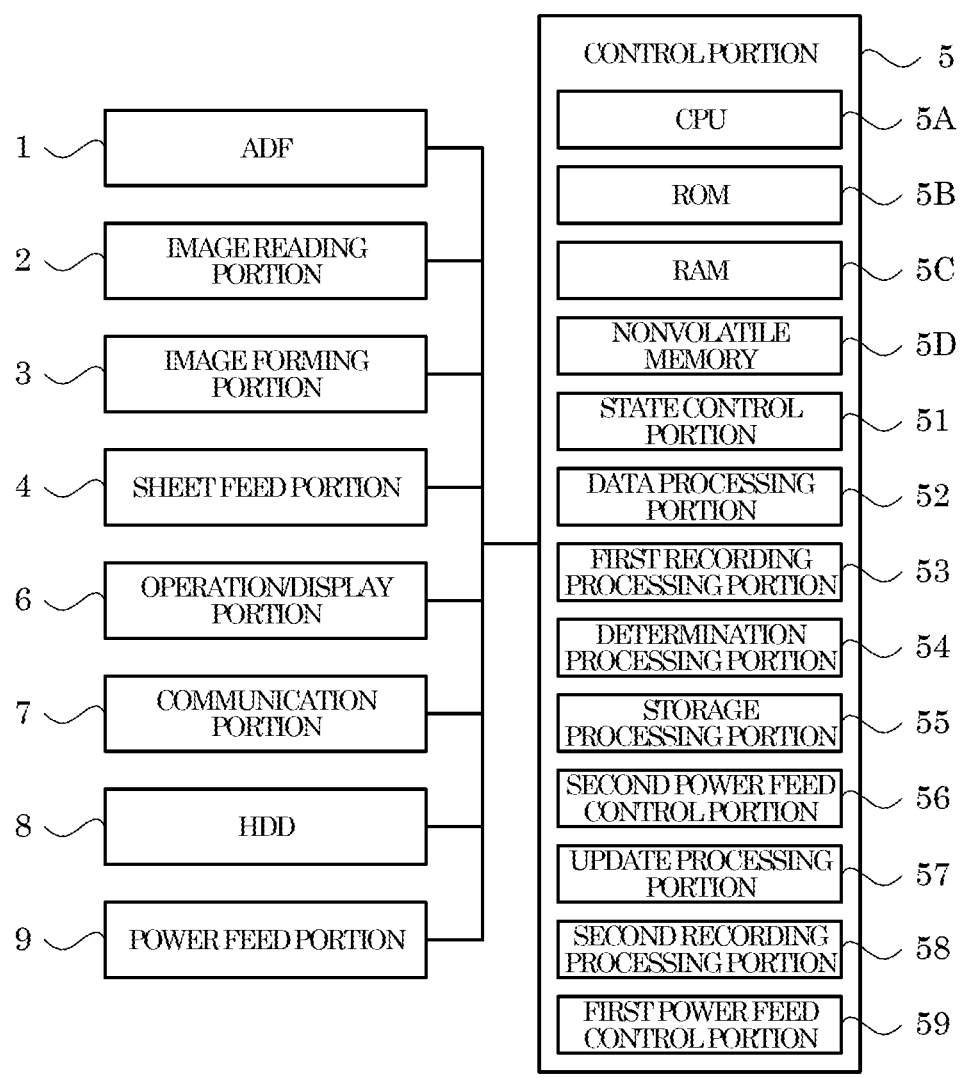
FIG. 2 is a block diagram showing a system configuration of the image forming apparatus according to the embodiment of the present disclosure.

As shown in FIG. 1 and FIG. 2, the image forming apparatus 10 includes an ADF (Automatic Document Feeder) 1, an image reading portion 2, an image forming portion 3, a sheet feed portion 4, a control portion 5, an operation/display portion 6, a communication portion 7, a HDD (Hard Disk Drive) 8, and a power feed portion 9. Here, the image forming apparatus 10 is an example of an information processing apparatus of the present disclosure. It is noted that the information processing apparatus of the present disclosure may be a scanner, a printer, a facsimile apparatus, a copier, a personal computer, or a notebook computer, each including the control portion 5.

The ADF 1 includes a document sheet setting portion, a plurality of conveyance rollers, a document sheet pressing, and a sheet discharge portion, and is configured to convey a document sheet so that the document sheet is read by the image reading portion 2. The image reading portion 2 includes a document sheet table, a light source, a plurality of mirrors, an optical lens, and a CCD, and is configured to read image data from a document sheet.

The image forming portion 3 is configured to form an image on a sheet by an electrophotographic system based on image data read by the image reading portion 2, or based on image data input from an external information processing apparatus. Specifically, the image forming portion 3 includes a photoconductor drum, a charging device, a laser scanning unit (LSU), a developing device, a transfer roller, a cleaning device, a fixing roller, a pressure roller, and a sheet discharge tray. It is noted that the image forming portion 3 may form an image by another image forming system such as an inkjet system.

The sheet feed portion 4 includes a sheet feed cassette, a sheet conveyance path, and a plurality of conveyance rollers, and is configured to supply sheets one by one to the image forming portion 3. The image forming portion 3 forms an image on a sheet fed from the sheet feed portion 4, based on the image data. The sheet with the image formed by the image forming portion 3 is discharged onto the sheet discharge tray.

As shown in FIG. 2, the control portion 5 includes control equipment such as a CPU 5A, a ROM 5B, a RAM 5C, and a nonvolatile memory 5D. The CPU 5A is a processor for executing various calculation processes. The ROM 5B is a nonvolatile storage device in which various information such as control programs for causing the CPU 5A to execute various processes are stored in advance. The RAM 5C is a volatile storage device, and is used as a temporary storage memory (working area) for the various processes executed by the CPU 5A. The nonvolatile memory 5D is a nonvolatile storage device such as a flash memory or an EEPROM. In the control portion 5, the CPU 5A executes the various control programs that are preliminarily stored in the ROM 5B. This allows the image forming apparatus 10 to be controlled comprehensively by the control portion 5. It is noted that the control portion 5 may be formed as an electronic circuit such as an integrated circuit (ASIC), and may be a control portion provided independently of a main control portion that comprehensively controls the image forming apparatus 10.

The operation/display portion 6 includes a display portion and an operation portion. The display portion is, for example, a liquid crystal display and displays various types of information in response to control instructions from the control portion 5. The operation portion is composed of, for example, operation keys or a touch panel through which various types of information are input to the control portion 5 in response to user operations.

The communication portion 7 is a communication interface that is configured to execute a wired or wireless data communication with external communication apparatuses.

The HDD 8 is a nonvolatile storage device. Here, the HDD 8 is an example of a first storage portion of the present disclosure. It is noted that the first storage device of the present disclosure may be a disc drive that drives a recording medium such as an optical disc, not a magnetic disk. In addition, the first storage device of the present disclosure may be a nonvolatile storage device such as a SSD (Solid State Drive).

The HDD 8 stores various types of data. For example, the HDD 8 stores system data concerning the system of the image forming apparatus 10, such as a model name and a serial number of the image forming apparatus 10, version information of the firmware, and information concerning option devices connected with the image forming apparatus 10. In addition, the HDD 8 stores address data concerning registered destinations to which image data read by the image reading portion 2 is transmitted. The HDD 8 also stores operation history data concerning the operation history of the image forming apparatus 10.

An external information processing apparatus(es) communicably connected with the image forming apparatus 10 is allowed to access the data stored in the HDD 8. For example, in response to a request from an external information processing apparatus, the control portion 5 displays, on a display portion of the external information processing apparatus, a webpage for receiving an access request for accessing data stored in the HDD 8. When an access request for accessing data stored in the HDD 8 has been received on the webpage, the control portion 5 executes a process based on the access request.

For example, when a consultation request for consulting the system data has been received on the webpage, the image forming apparatus 10 reads the system data from the HDD 8 and displays the read system data on the display portion of the information processing apparatus that transmitted the consultation request. In addition, when a change request for changing the address data has been received on the webpage, the image forming apparatus 10 rewrites the address data stored in the HDD 8 based on the change request.

The power feed portion 9 is configured to feed electric power supplied from an external power supply to the HDD 8. For example, the power feed portion 9 is an AC-DC converter for converting an AC voltage of 100 V supplied from the external power supply to a DC voltage of a predetermined voltage value.

Specifically, when the image forming apparatus 10 is operating in a normal mode, the power feed portion 9 feeds the electric power supplied from the external power supply to the HDD 8. On the other hand, when the operation of the image forming apparatus 10 has shifted from the normal mode to a power saving mode, the power feed portion 9 stops the power feed to the HDD 8.

Here, the power saving mode is an operation mode in which lower power is consumed than in the normal mode. The image forming apparatus 10 operates in either the normal mode or the power saving mode. The operation mode of the image forming apparatus 10 is switched by a state control portion 51 that is described below.

In a case where reading data from or writing data to the HDD 8 is performed while the image forming apparatus 10 is operating in the power saving mode, the power feed portion 9 resumes the power feed to the HDD 8. In this case, the power feed portion 9 stops the power feed to the HDD 8 after the reading data from or writing data to the HDD 8 is completed.

Meanwhile, in the image forming apparatus 10, if an access request for accessing data stored in the HDD 8 is received many times while the image forming apparatus 10 is operating in the power saving mode, the HDD 8 is activated many times. When the number of activations of the HDD 8 increases, a possibility of occurrence of a malfunction, such as a failure, of the HDD 8 increases. One possible solution to this problem is to reduce the number of activations of the HDD 8 by providing a grace period between completion of reading data from or writing data to the HDD 8 and stopping the power feed to the HDD 8.

However, the above-mentioned solution increases the power consumption of the HDD 8. On the other hand, as described in the following, in the image forming apparatus 10 according to the embodiment of the present disclosure, it is possible to reduce the number of activations of the HDD 8 without extending the time period of the power feed to the HDD 8.

Specifically, the ROM 5B of the control portion 5 preliminarily stores a power feed control program that causes the CPU 5A of the control portion 5 to execute a first power feed control process (see the flowchart of FIG. 3), and a second power feed control process (see the flowchart of FIG. 4) that are described below. It is noted that the power feed control program may be recorded on a computer-readable recording medium such as a CD, a DVD, or a flash memory, and may be read from the recording medium to be installed in the nonvolatile memory 5D.

As shown in FIG. 2, the control portion 5 includes a state control portion 51, a data processing portion 52, a first recording processing portion 53, a determination processing portion 54, a storage processing portion 55, a second power feed control portion 56, an update processing portion 57, a second recording processing portion 58, a first power feed control portion 59. Specifically, the control portion 5 executes the power feed control program stored in the ROM 5B by using the CPU 5A. This allows the control portion 5 to function as the state control portion 51, the data processing portion 52, the first recording processing portion 53, the determination processing portion 54, the storage processing portion 55, the second power feed control portion 56, the update processing portion 57, the second recording processing portion 58, and the first power feed control portion 59.

The state control portion 51 controls the operation mode of the image forming apparatus 10.

Specifically, when a predetermined first shift condition is satisfied while the image forming apparatus 10 is operating in the normal mode, the state control portion 51 shifts the operation mode from the normal mode to the power saving mode. For example, the first shift condition is that the image forming apparatus 10 is executing no job and the operation/display portion 6 has not been operated for more than a predetermined reference time period.

In addition, when a predetermined second shift condition is satisfied while the image forming apparatus 10 is operating in the power saving mode, the state control portion 51 shifts the operation mode from the power saving mode to the normal mode. For example, the second shift condition is that an instruction to execute a job is input, or that the operation/display portion 6 is operated.

The state control portion 51 stops the power feed to the HDD 8 when it shifts the operation mode of the image forming apparatus 10 from the normal mode to the power saving mode. Specifically, the state control portion 51 causes the power feed portion 9 to stop the power feed to the HDD 8 by inputting a control signal to the power feed portion 9. In addition, the state control portion 51 resumes the power feed to the HDD 8 when it shifts the operation mode of the image forming apparatus 10 from the power saving mode to the normal mode. Specifically, the state control portion 51 causes the power feed portion 9 to resume the power feed to the HDD 8 by inputting a control signal to the power feed portion 9.

The data processing portion 52, when an access request for accessing data stored in the HDD 8 has been received, executes a process on access-target data based on the access request.

The first recording processing portion 53 records the number of accesses to the data stored in the HDD 8 for each piece of the data stored in the HDD 8.

For example, in the image forming apparatus 10, a plurality of first count values are preliminarily stored in the nonvolatile memory 5D of the control portion 5 respectively in correspondence with a plurality of pieces of data stored in the HDD 8, each first count value indicating the number of accesses to each corresponding piece of data stored in the HDD 8.

When the data processing portion 52 has executed a process on a piece of data stored in the HDD 8, the first recording processing portion 53 increments a first count value corresponding to the process-target data. In addition, the first recording processing portion 53 resets the first count values each time a predetermined first period elapses. Here, the first period is arbitrarily set, and is, for example, one day, one week, or one month.

It is noted that the first recording processing portion 53 may not reset the first count values.

The determination processing portion 54, in a case where the power feed to the HDD 8 is stopped, determines specific data based on the number of accesses to each piece of data stored in the HDD 8. Here, the specific data is selected from among the data stored in the HDD 8 and is stored into the RAM 5C of the control portion 5.

For example, the determination processing portion 54 determines, as the specific data, one or more pieces of data from among the data stored in the HDD 8, the one or more pieces of data respectively corresponding to one or more first count values that are each higher than a predetermined first threshold. Here, the first threshold is arbitrarily set, and is, for example, 10 or 100.

It is noted that when a total size of a plurality of pieces of data for the first count values that are each higher than the first threshold, is larger than a predetermined allowable size, the determination processing portion 54 may determine the specific data such that the total size of the specific data is not larger than the allowable size. For example, the determination processing portion 54 may select, as the specific data, from among the plurality of pieces of data for the first count values that are each higher than the first threshold, one or more pieces of data in decreasing order of the corresponding first count values such that the total size of the specific data is not larger than the allowable size.

In addition, the determination processing portion 54 may select, as the specific data, from among a plurality of pieces of data stored in the HDD 8, one or more pieces of data in decreasing order of the corresponding first count values such that the total size of the specific data is not larger than the allowable size.

The storage processing portion 55, in a case where the power feed to the HDD 8 is stopped, stores the specific data determined by the determination processing portion 54 into the RAM 5C of the control portion 5. Here, the RAM 5C is an example of a second storage portion of the present disclosure. It is noted that the second storage portion of the present disclosure may be the nonvolatile memory 5D.

Specifically, the storage processing portion 55 stores the specific data into a predetermined storage area of the RAM 5C. It is noted that the allowable size is equal to or smaller than the size of the storage area.

In a case where an access request for accessing data stored in the HDD 8 is received while the image forming apparatus 10 is operating in the power saving mode, the second power feed control portion 56 determines whether or not the access-target data is stored in the RAM 5C of the control portion 5.

Upon determining that the access-target data is not stored in the RAM 5C of the control portion 5, the second power feed control portion 56 resumes the power feed to the HDD 8. On the other hand, upon determining that the access-target data is stored in the RAM 5C of the control portion 5, the second power feed control portion 56 does not resume the power feed to the HDD 8.

Here, when the second power feed control portion 56 determines that the access-target data is not stored in the RAM 5C of the control portion 5, the data processing portion 52 executes a process on the access-target data stored in the HDD 8 based on the received access request after the power feed to the HDD 8 is resumed. In addition, when the second power feed control portion 56 determines that the access-target data is stored in the RAM 5C of the control portion 5, the data processing portion 52 executes a process on the access-target data stored in the RAM 5C based on the received access request.

The update processing portion 57, when the power feed to the HDD 8 is resumed, updates the data stored in the HDD 8 based on the data stored in the storage area of the RAM 5C of the control portion 5.

Here, when a shut-off of the power supply to the image forming apparatus 10 is instructed, the second power feed control portion 56 resumes the power feed to the HDD 8. With this configuration, in a case where a change is made to data stored in the RAM 5C and then a shut-off of the power supply to the image forming apparatus 10 is instructed, it is possible to reflect the change that has been made to the data stored in the RAM 5C, to the data stored in the HDD 8.

It is noted that in a case where the storage processing portion 55 stores the specific data in the nonvolatile memory 5D, the second power feed control portion 56 does not need to resume the power feed to the HDD 8 if a shut-off of the power supply to the image forming apparatus 10 is instructed.

In addition, when the image forming apparatus 10 is operating in the power saving mode, only a consultation request for consulting the system data stored in the HDD 8 may be received. In this case, the control portion 5 may not include the update processing portion 57.

The second recording processing portion 58 records the number of resumptions of the power feed to the HDD 8 by the second power feed control portion 56, at the interval of a predetermined second period (an example of a specific period of the present disclosure).

For example, in the image forming apparatus 10, a second count value is preliminarily stored in the nonvolatile memory 5D of the control portion 5, the second count value indicating the number of resumptions of the power feed to the HDD 8 by the second power feed control portion 56.

The second recording processing portion 58 is configured to increment the second count value each time the power feed to the HDD 8 is resumed by the second power feed control portion 56. In addition, the second recording processing portion 58 resets the second count value each time the second period elapses. Here, the second period is arbitrarily set, and is, for example, one day, one week, or one month.

In a case where reading data from or writing data to the HDD 8 is completed while the image forming apparatus 10 is operating in the power saving mode, the first power feed control portion 59 stops the power feed to the HDD 8.

When the number of resumptions of the power feed to the HDD 8 by the second power feed control portion 56 during the second period is higher than a predetermined second threshold (an example of a threshold of the present disclosure), the first power feed control portion 59 refrains from stopping the power feed to the HDD 8 until a predetermined wait time elapses from a completion of reading data from or writing data to the HDD 8. Here, the second threshold is arbitrarily set, and is, for example, 10 or 100. In addition, the wait time is arbitrarily set, and is, for example, 10 seconds, one minute, or 5 minutes.

It is noted that the first power feed control portion 59 may stop the power feed to the HDD 8 immediately after reading data from or writing data to the HDD 8 is completed, regardless of the number of resumptions of the power feed to the HDD 8 by the second power feed control portion 56 during the second period. In this case, the control portion 5 may not include the second recording processing portion 58.

In addition, the first power feed control portion 59 may stop the power feed to the HDD 8 after reading data from or writing data to the HDD 8 is completed, regardless of the operation mode of the image forming apparatus 10. In this case, when an access request for accessing data stored in the HDD 8 is received, the second power feed control portion 56 may determine whether or not to resume the power feed to the HDD 8 based on whether or not the access-target data of the access request is stored in the RAM 5C, regardless of the operation mode of the image forming apparatus 10. In addition, the control portion 5 may not include the state control portion 51.

First Power Feed Control Process

Figure 3:
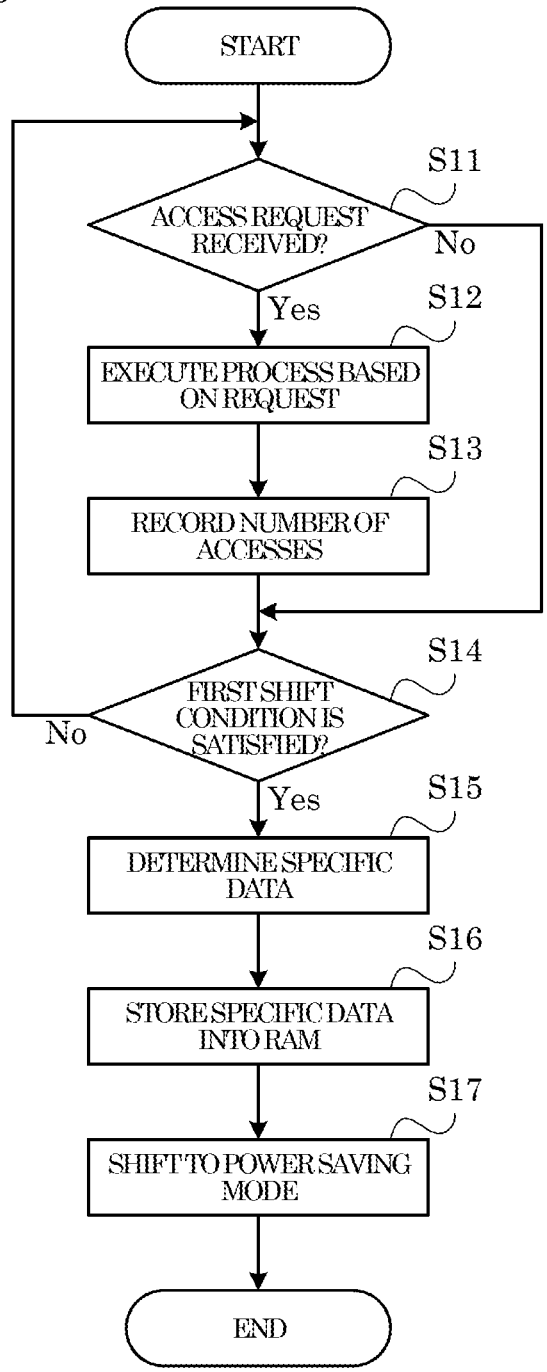
FIG. 3 is a flowchart showing an example of a first power feed control process executed by the image forming apparatus according to the embodiment of the present disclosure.

In the following, with reference to FIG. 3, a description is given of an example of the procedure of the first power feed control process executed by the control portion 5 in the image forming apparatus 10. Here, steps S11, S12, . . . represent numbers assigned to the processing procedures (steps) executed by the control portion 5. It is noted that the first power feed control process is executed while the image forming apparatus 10 is operating in the normal mode.

Step S11

First, in step S11, the control portion 5 determines whether or not an access request for accessing data stored in the HDD 8 has been received.

Here, upon determining that a request for accessing data stored in the HDD 8 has been received (Yes side at S11), the control portion 5 moves the process to step S12. In addition, upon determining that a request for accessing data stored in the HDD 8 has not been received (No side at S11), the control portion 5 moves the process to step S14.

Step S12

In step S12, the control portion 5 executes a process on the access-target data stored in the HDD 8 based on the received access request. Here, the process of step S12 is executed by the data processing portion 52 of the control portion 5.

Step S13

In step S13, the control portion 5 records the number of accesses to a piece of data that was the process-target data in step S12. Here, the process of step S13 is executed by the first recording processing portion 53 of the control portion 5.

Specifically, the control portion 5 increments the first count value corresponding to the process-target data. It is noted that the process of step S13 may be omitted.

Step S14

In step S14, the control portion 5 determines whether or not the first shift condition is satisfied.

Here, upon determining that the first shift condition is satisfied (Yes side at S14), the control portion 5 moves the process to step S15. In addition, upon determining that the first shift condition is not satisfied (No side at S14), the control portion 5 moves the process to step S11.

Step S15

In step S15, the control portion 5 determines the specific data based on the number of accesses to each piece of data stored in the HDD 8. Here, the process of step S15 is executed by the determination processing portion 54 of the control portion 5.

Specifically, the control portion 5 determines, as the specific data, among the data stored in the HDD 8, one or more pieces of data that correspond to first count values that are each higher than the first threshold.

Step S16

In step S16, the control portion 5 stores the specific data determined in step S15 into the storage area of the RAM 5C. Here, the process of step S16 is executed by the storage processing portion 55 of the control portion 5.

Step S17

In step S17, the control portion 5 shifts the operation mode of the image forming apparatus 10 from the normal mode to the power saving mode. Here, the process of step S17 is executed by the state control portion 51 of the control portion 5.

Specifically, the control portion 5 stops the power feed to the HDD 8 by inputting a control signal to the power feed portion 9.

Second Power Feed Control Process

Figure 4:
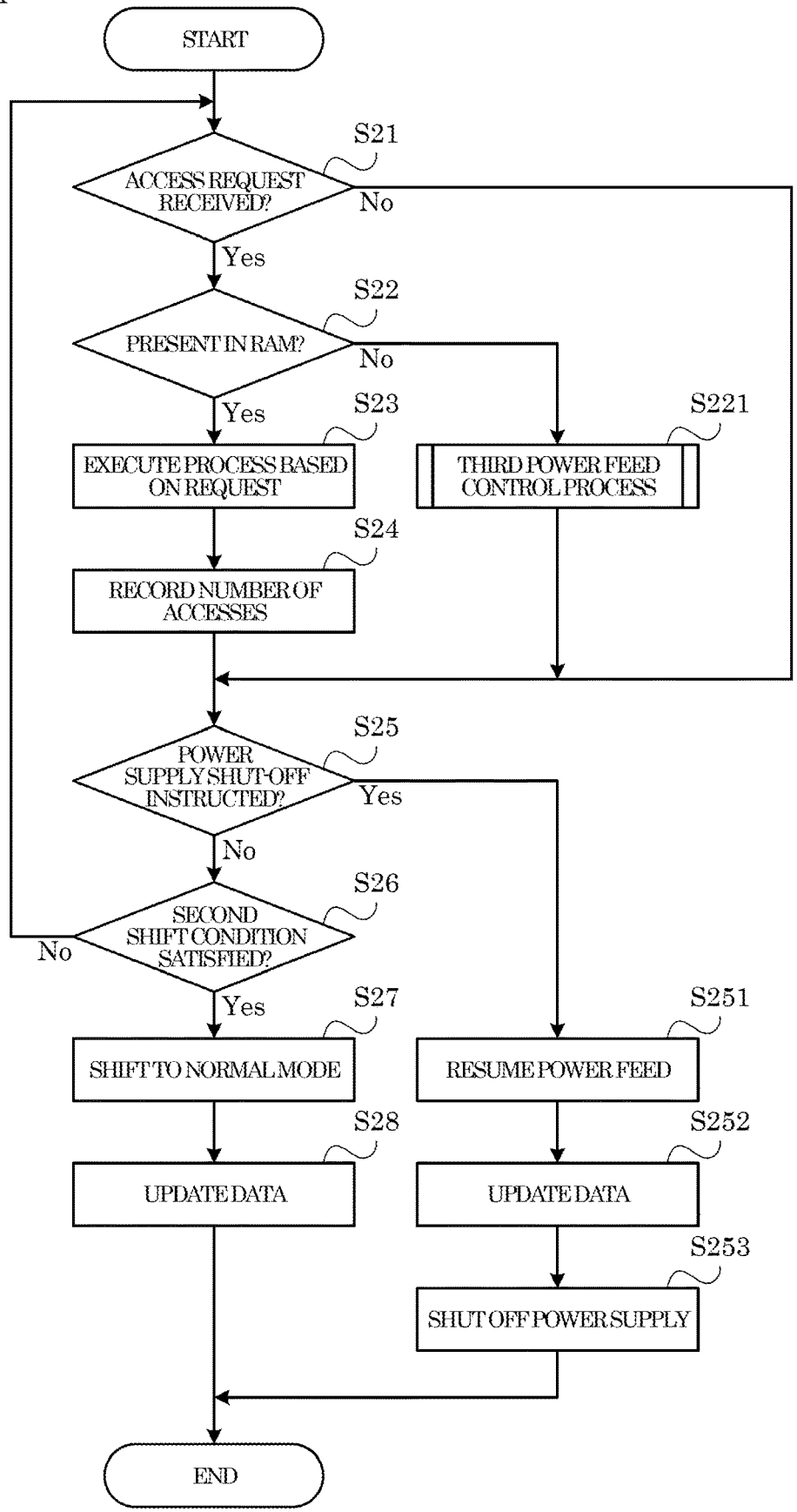
FIG. 4 is a flowchart showing an example of a second power feed control process executed by the image forming apparatus according to the embodiment of the present disclosure.

In the following, with reference to FIG. 4, a description is given of an example of the procedure of the second power feed control process executed by the control portion 5 in the image forming apparatus 10. It is noted that the second power feed control process is executed while the image forming apparatus 10 is operating in the power saving mode.

Step S21

First, in step S21, the control portion 5 determines whether or not an access request for accessing data stored in the HDD 8 has been received.

Here, upon determining that a request for accessing data stored in the HDD 8 has been received (Yes side at S21), the control portion 5 moves the process to step S22. In addition, upon determining that a request for accessing data stored in the HDD 8 has not been received (No side at S21), the control portion 5 moves the process to step S25.

Step S22

In step S22, the control portion 5 determines whether or not the access-target data is stored in the storage area of the RAM 5C.

Here, upon determining that the access-target data is stored in the storage area of the RAM 5C (Yes side at S22), the control portion 5 moves the process to step S23. In addition, upon determining that the access-target data is not stored in the storage area of the RAM 5C (No side at S22), the control portion 5 moves the process to step S221.

Step S221

In step S221, the control portion 5 executes a third power feed control process that is described below.

Step S23

In step S23, the control portion 5 executes a process on the access-target data stored in the storage area of the RAM 5C, based on the received access request. Here, the process of step S23 is executed by the data processing portion 52 of the control portion 5.

Step S24

In step S24, the control portion 5 records the number of accesses to a piece of data that was the process-target data in step S23. Here, the process of step S24 is executed by the first recording processing portion 53 of the control portion 5. It is noted that the process of step S24 may be omitted.

Step S25

In step S25, the control portion 5 determines whether or not a shut-off of the power supply to the image forming apparatus 10 has been instructed. For example, when a power supply key provided on the operation/display portion 6 has been operated, the control portion 5 determines that a shut-off of the power supply to the image forming apparatus 10 has been instructed.

Here, upon determining that a shut-off of the power supply to the image forming apparatus 10 has been instructed (Yes side at S25), the control portion 5 moves the process to step S251. In addition, upon determining that a shut-off of the power supply to the image forming apparatus 10 has not been instructed (No side at S25), the control portion 5 moves the process to step S26.

Step S26

In step S26, the control portion 5 determines whether or not the second shift condition is satisfied.

Here, upon determining that the second shift condition is satisfied (Yes side at S26), the control portion 5 moves the process to step S27. In addition, upon determining that the second shift condition is not satisfied (No side at S26), the control portion 5 moves the process to step S21.

Step S27

In step S27, the control portion 5 shifts the operation mode of the image forming apparatus 10 from the power saving mode to the normal mode. Here, the process of step S27 is executed by the state control portion 51 of the control portion 5.

Specifically, the control portion 5 causes the power feed portion 9 to resume the power feed to the HDD 8 by inputting a control signal to the power feed portion 9.

Step S28

In step S28, the control portion 5 updates the data stored in the HDD 8 based on the data stored in the storage area of the RAM 5C. Here, the process of step S28 is executed by the update processing portion 57 of the control portion 5. It is noted that the process of step S28 may be omitted.

Step S251

In step S251, the control portion 5 resumes the power feed to the HDD 8. Here, the process of step S251 is executed by the second power feed control portion 56 of the control portion 5.

Step S252

In step S252, the control portion 5 updates the data stored in the HDD 8 based on the data stored in the storage area of the RAM 5C. Here, the process of step S252 is executed by the update processing portion 57 of the control portion 5. It is noted that the processes of steps S251 and S252 may be omitted.

Step S253

In step S253, the control portion 5 shuts off the power supply to the image forming apparatus 10.

Third Power Feed Control Process

Figure 5:
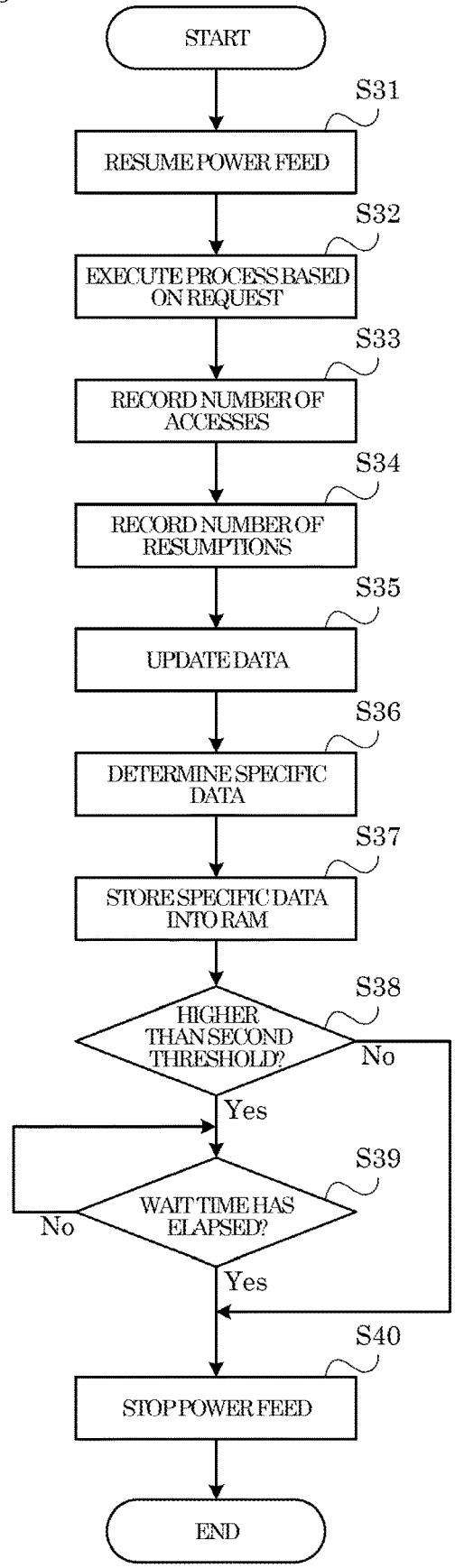
FIG. 5 is a flowchart showing an example of a third power feed control process executed by the image forming apparatus according to the embodiment of the present disclosure.

Next, with reference to FIG. 5, a description is given of an example of the procedure of the third power feed control process executed in step S221 of the second power feed control process.

Step S31

First, in step S31, the control portion 5 resumes the power feed to the HDD 8. Here, the process of step S31 is executed by the second power feed control portion 56 of the control portion 5.

Step S32

In step S32, the control portion 5 executes a process on the access-target data stored in the HDD 8, based on the received access request. Here, the process of step S32 is executed by the data processing portion 52 of the control portion 5.

Step S33

In step S33, the control portion 5 records the number of accesses to a piece of data that was the process-target data in step S32. Here, the process of step S33 is executed by the first recording processing portion 53 of the control portion 5. It is noted that the process of step S33 may be omitted.

Step S34

In step S34, the control portion 5 records the number of resumptions of the power feed to the HDD 8. Here, the process of step S34 is executed by the second recording processing portion 58 of the control portion 5.

Specifically, the control portion 5 increments the second count value. It is noted that the process of step S34 may be omitted.

Step S35

In step S35, the control portion 5 updates the data stored in the HDD 8 based on the data stored in the storage area of the RAM 5C. Here, the process of step S35 is executed by the update processing portion 57 of the control portion 5. It is noted that the process of step S35 may be omitted.

Step S36

In step S36, the control portion 5 determines the specific data based on the number of accesses to each piece of data stored in the HDD 8. Here, the process of step S36 is executed by the determination processing portion 54 of the control portion 5.

Step S37

In step S37, the control portion 5 stores the specific data determined in step S36 into the storage area of the RAM 5C. Here, the process of step S37 is executed by the storage processing portion 55 of the control portion 5.

Step S38

In step S38, the control portion 5 determines whether or not the number of resumptions of the power feed to the HDD 8 is higher than the second threshold.

Specifically, upon determining that the second count value is higher than the second threshold, the control portion 5 determines that the number of resumptions of the power feed to the HDD 8 is higher than the second threshold.

Here, upon determining that the number of resumptions of the power feed to the HDD 8 is higher than the second threshold (Yes side at S38), the control portion 5 moves the process to step S39. In addition, upon determining that the number of resumptions of the power feed to the HDD 8 is not higher than the second threshold (No side at S38), the control portion 5 moves the process to step S40.

Step S39

In step S39, the control portion 5 determines whether or not the wait time has elapsed from an end of the process of step S32.

The above-described configuration makes it possible to suppress increase of the number of activations of the HDD 8 even in a case where one or more pieces of data different from the specific data among the data stored in the HDD 8 are frequently accessed in a short period during the power saving mode.

Here, upon determining that the wait time has elapsed (Yes side at S39), the control portion 5 moves the process to step S40. In addition, upon determining that the wait time has not elapsed (No side at S39), the control portion 5 waits at step S39 for the wait time to elapse. It is noted that the processes of steps S38 and S39 may be omitted.

Step S40

In step S40, the control portion 5 stops the power feed to the HDD 8. Here, the process of step S40 is executed by the first power feed control portion 59 of the control portion 5.

It is noted that the first power feed control process and the processes of steps S26 to S28 in the second power feed control process may be omitted. In this case, upon determining in step S25 that a shut-off of the power supply to the image forming apparatus 10 has not been instructed, the control portion 5 moves the process to step S21.

As described above, in the image forming apparatus 10, in a case where the power feed to the HDD 8 is stopped, the specific data among the data stored in the HDD 8 is stored in the RAM 5C. Even when an access request for accessing data stored in the HDD 8 is received while the power feed to the HDD 8 is stopped, if the access-target data is stored in the RAM 5C, resumption of the power feed to the HDD 8 is restricted. This makes it possible to reduce the number of activations of the HDD 8 without extending the time period of the power feed to the HDD 8.

In addition, in the image forming apparatus 10, the specific data is determined based on the number of accesses to each piece of data stored in the HDD 8. With this configuration, it is possible to determine, as the specific data, one or more pieces of data that are frequently accessed in a short period, namely that have a high frequency of access, and reduce the number of activations of the HDD 8 during the power saving mode compared to a configuration where the specific data is determined irrelevant to the frequency of access.

It is noted that in another embodiment, the determination processing portion 54 may determine the specific data based on the elapsed time from the last access time to each piece of data stored in the HDD 8. Specifically, the determination processing portion 54 may select, as the specific data, one or more pieces of data in increasing order of the elapsed time from the last access time, from among the plurality of pieces of data stored in the HDD 8. For example, information indicating the last access time to each piece of data in the HDD 8 is recorded on the nonvolatile memory 5D. In this other embodiment, the control portion 5 may not include the first recording processing portion 53.

In addition, in a still another embodiment, the determination processing portion 54 may determine, as the specific data, one or more pieces of data that are specified in advance. The specific data may be specified during the manufacturing stage of the image forming apparatus 10, or may be specified by user operations performed on the operation/display portion 6. In the still another embodiment, the control portion 5 may not include the first recording processing portion 53 and the determination processing portion 54.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An information processing apparatus comprising:
a first power feed control portion configured to stop power feed to a nonvolatile first storage portion when reading data from or writing data to the first storage portion is completed;
a volatile second storage portion;
a storage processing portion configured to, in a case where the power feed to the first storage portion is stopped, store predetermined specific data among data stored in the first storage portion into the second storage portion;
a second power feed control portion configured to, when an access request for accessing data stored in the first storage portion has been received, and access-target data specified in the access request is not stored in the second storage portion, resume power feed to the first storage portion, and when the access request for accessing the data stored in the first storage portion has been received, and the access-target data is stored in the second storage portion, not resume the power feed to the first storage portion;
a data processing portion configured to, when the access request is received and the access-target data is stored in the second storage portion, execute a process on the access-target data stored in the second storage portion based on the access request; and
an update processing portion configured to, when a shut-off of power supply to the information processing apparatus is instructed, update the data stored in the first storage portion based on data stored in the second storage portion, wherein
when the shut-off of the power supply to the information processing apparatus is instructed, the second power feed control portion resumes the power feed to the first storage portion before the power supply to the information processing apparatus is shut off, and
the update processing portion updates the data stored in the first storage portion based on the data stored in the second storage portion after the second power feed control portion resumes the power feed to the first storage portion and before the power supply to the information processing apparatus is shut off.

2. The information processing apparatus according to claim 1, further comprising:
a first recording processing portion configured to record a number of accesses to each piece of data stored in the first storage portion; and
a determination processing portion configured to determine the specific data based on the number of accesses to each piece of data stored in the first storage portion.

3. The information processing apparatus according to claim 1, further comprising:
a determination processing portion configured to determine the specific data based on an elapsed time from a last access time to each piece of data stored in the first storage portion.

4. The information processing apparatus according to claim 1, further comprising:
a second recording processing portion configured to record a number of resumptions of power feed to the first storage portion at an interval of a predetermined specific period, wherein
when the number of resumptions of power feed during the specific period is higher than a predetermined threshold, the first power feed control portion refrains from stopping power feed to the first storage portion until a predetermined wait time elapses from a completion of reading data from or writing data to the first storage portion.

5. A power feed control method executed in an information processing apparatus that includes a volatile second storage portion, the power feed control method executing:
stopping power feed to a nonvolatile first storage portion when reading data from or writing data to the first storage portion is completed;
in a case where the power feed to the first storage portion is stopped, storing predetermined specific data among data stored in the first storage portion into the second storage portion;
when an access request for accessing data stored in the first storage portion has been received, and access-target data specified in the access request is not stored in the second storage portion, resuming power feed to the first storage portion, and when the access request for accessing the data stored in the first storage portion has been received, and the access-target data is stored in the second storage portion, not resuming the power feed to the first storage portion;

when the access request is received and the access-target data is stored in the second storage portion, executing a process on the access-target data stored in the second storage portion based on the access request; and when a shut-off of power supply to the information processing apparatus is instructed, updating the data stored in the first storage portion based on data stored in the second storage portion, wherein when the shut-off of the power supply to the information processing apparatus is instructed, the power feed to the first storage portion is resumed before the power supply to the information processing apparatus is shut off, and the data stored in the first storage portion is updated based on the data stored in the second storage portion after the power feed to the first storage portion is resumed and before the power supply to the information processing apparatus is shut off.

* * * * *